(12) United States Patent
Nakatsuka et al.

(10) Patent No.: US 10,744,551 B2
(45) Date of Patent: Aug. 18, 2020

(54) ROLLING-SWAGING TOOL AND METHOD FOR CLOSING OPENING OF CYLINDRICAL MEMBER USING SAME

(71) Applicant: DAICEL CORPORATION, Osaka-shi, Osaka (JP)

(72) Inventors: Naoki Nakatsuka, Tatsuno (JP); Masakazu Tokuda, Tatsuno (JP); Masayuki Nakayasu, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 164 days.

(21) Appl. No.: 15/743,400

(22) PCT Filed: Jul. 15, 2016

(86) PCT No.: PCT/JP2016/070931
§ 371 (c)(1),
(2) Date: Jan. 10, 2018

(87) PCT Pub. No.: WO2017/029916
PCT Pub. Date: Feb. 23, 2017

(65) Prior Publication Data
US 2018/0200774 A1 Jul. 19, 2018

(30) Foreign Application Priority Data
Aug. 19, 2015 (JP) .................. 2015-161508

(51) Int. Cl.
*B21D 39/02* (2006.01)
*B21D 39/06* (2006.01)
(Continued)

(52) U.S. Cl.
CPC ............ *B21D 39/06* (2013.01); *B21D 39/02* (2013.01); *B21D 41/04* (2013.01); *B60R 21/264* (2013.01); *B60R 2021/26076* (2013.01)

(58) Field of Classification Search
CPC ........ B21D 9/10; B21D 19/04; B21D 19/046; B21D 41/04; B21D 41/045; B21D 22/14;
(Continued)

(56) References Cited

U.S. PATENT DOCUMENTS 6,192,561 B1 * 2/2001 Bennett ................. B21D 41/04
72/118
7,802,813 B2 * 9/2010 Yamashita ............. B21D 39/06
280/741
(Continued)

FOREIGN PATENT DOCUMENTS

JP 2006-306218 A 11/2006
JP 2007-30656 A 2/2007
(Continued)

*Primary Examiner* — Pradeep C Battula
(74) *Attorney, Agent, or Firm* — Birch, Stewart, Kolasch & Birch, LLP (57) ABSTRACT

A rolling-swaging tool for closing an opening of a cylindrical housing includes: a support shaft connected to a driving body; rotating shafts extending in directions orthogonal to the support shaft; and swaging portions, each of which being attached to each of the rotating shafts. The swaging portions have, an annular first swaging portion having a minimum thickness and a maximum outer diameter, a disk third swaging portion having a maximum thickness and a minimum outer diameter, and an annular second swaging portion having a thickness between the minimum thickness and the maximum thickness and an outer diameter between the maximum outer diameter and the minimum outer diameter. The tool also has a first annular inclined surface provided between the annular first swaging portion and the annular second swaging portion, and a second annular inclined surface provided between the annular second swaging portion and the disk third swaging portion.

7 Claims, 9 Drawing Sheets

(51) Int. Cl.
*B21D 41/04* (2006.01)
*B60R 21/264* (2006.01)
*B60R 21/26* (2011.01)

(58) Field of Classification Search
CPC .... B21D 22/1618; B21D 39/06; B21D 22/16;
B21D 22/18; B21D 39/02; B21B 27/024;
B21B 27/025; B21B 27/0228
See application file for complete search history.

(56) References Cited

U.S. PATENT DOCUMENTS

| | | |
|---|---|---|
| 2006/0255577 A1 | 11/2006 | Nakayasu et al. |
| 2007/0024038 A1 | 2/2007 | Numoto et al. |
| 2007/0200326 A1 | 8/2007 | Nakayasu et al. |
| 2009/0051152 A1 | 2/2009 | Yamashita et al. |
| 2011/0187088 A1 | 8/2011 | Hanano et al. |
| 2011/0248486 A1 | 10/2011 | Numoto |
| 2011/0254254 A1 | 10/2011 | Numoto |
| 2014/0123868 A1 | 5/2014 | Kobayashi |
| 2014/0208975 A1 | 7/2014 | Kobayashi et al. |
| 2014/0230685 A1 | 8/2014 | Hanano et al. |
| 2016/0214564 A1 | 7/2016 | Imoto et al. |
| 2016/0257280 A1 | 9/2016 | Hanano et al. |

FOREIGN PATENT DOCUMENTS

| | | |
|---|---|---|
| JP | 2007-223485 A | 9/2007 |
| JP | 2008-241186 A | 10/2008 |
| JP | 2009-51236 A | 3/2009 |
| JP | 2010-264480 A | 11/2010 |
| JP | 2011-157025 A | 8/2011 |
| JP | 2011-218942 A | 11/2011 |
| JP | 2011-225069 A | 11/2011 |
| JP | 2014-94614 A | 5/2014 |
| JP | 2014-144736 A | 8/2014 |
| JP | 2014-156207 A | 8/2014 |
| JP | 2015-9666 A | 1/2015 |
| JP | 2015-74413 A | 4/2015 |
| JP | 2015-89760 A | 5/2015 |
| WO | WO 2014/208290 A1 | 12/2014 |

\* cited by examiner

ROLLING-SWAGING TOOL AND METHOD FOR CLOSING OPENING OF CYLINDRICAL MEMBER USING SAME

FIELD OF INVENTION

The present invention relates to a rolling-swaging tool used for swaging an opening of a cylindrical member, and to a method for closing the opening of the cylindrical member with a closing member by using the rolling-swaging tool.

DESCRIPTION OF RELATED ART

A gas generator for an airbag apparatus, in which an ignition device is attached to one end of a cylindrical housing and a diffuser portion provided with a gas discharge port is attached to the other end portion, is widely used.

Figure 10:
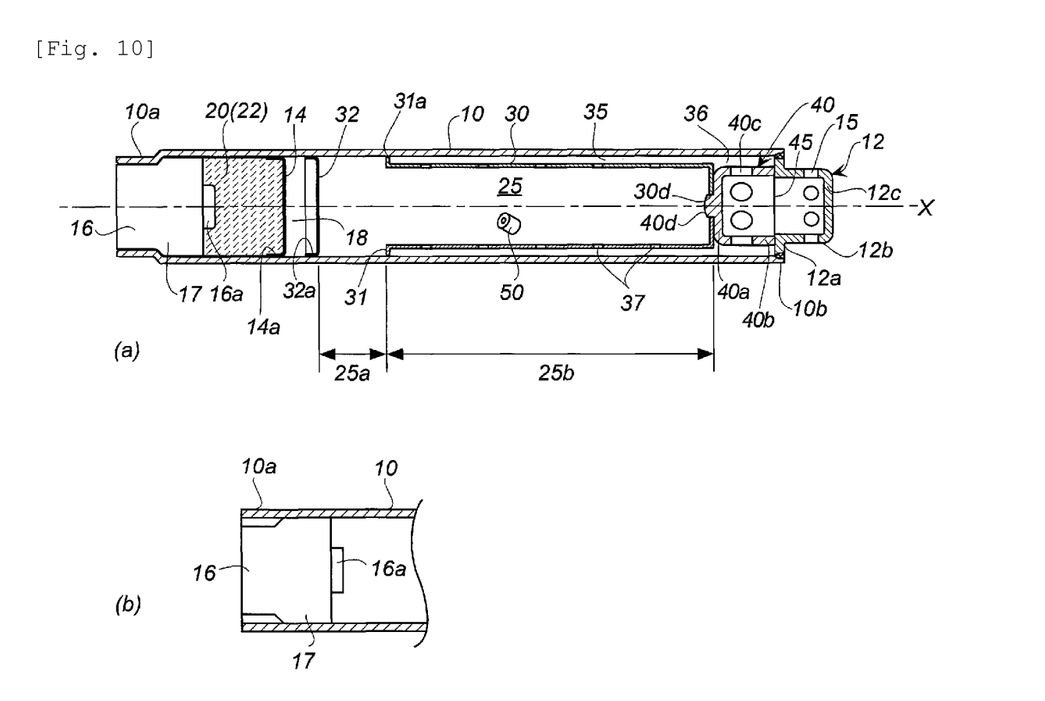

(a) in FIG. 10 of the present invention shows a gas generator shown in FIG. 1 of JP-A No. 2011-157025. As shown in (a) in FIG. 10, an igniter 16 serving as an ignition device is attached to one end 10a of a cylindrical housing 10. The igniter 16 is a known electric igniter fixed to a collar 17, and an ignition portion 16a which has an ignition agent protrudes from the collar 17.

SUMMARY OF INVENTION

The present invention provides a rolling-swaging tool or rolling-crimping tool used for swaging or crimping an opening of a cylindrical member in accordance with a rolling-swaging method or rolling-crimping method, the rolling-swaging tool or rolling-crimping tool, including:
  a support shaft connected to a driving body;
  a plurality of rotating shafts extending in directions orthogonal to the support shaft; and
  substantially disk-shaped swaging portions, each of which being attached to each of the rotating shafts,
  each of the substantially disk-shaped swaging portions having a first surface which performs swaging or crimping and a second surface on the opposite side in the thickness direction,
  the first surface having,
    an annular first swaging portion which has a minimum thickness and a maximum outer diameter,
    a disk third swaging portion which has a maximum thickness and a minimum outer diameter, and
    an annular second swaging portion which has a thickness between the minimum thickness and the maximum thickness and an outer diameter between the maximum outer diameter and the minimum outer diameter,
  a first annular inclined surface being provided at a boundary between the annular first swaging portion and the annular second swaging portion,
  a second annular inclined surface which is a curved surface, being provided at a boundary between the annular second swaging portion and the disk third swaging portion, and
  the second annular inclined surface being abutted against an outer circumferential edge of a distal end annular surface of the opening of the cylindrical member when the opening is swaged or crimped by rolling.

Further, the present invention provides a method for closing an opening of a cylindrical housing of a gas generator with a flat plate-shaped closing member by using the rolling-swaging tool or rolling-crimping tool, the cylindrical housing having a stepped surface formed radially on an inner side of a circumferential wall on the side of one of openings, and a distal end circumferential wall from the stepped surface to the opening, the flat plate-shaped closing member being a disk which includes a first surface, a second surface on the opposite side to the first surface in the thickness direction, and a circumferential surface between the first surface and the second surface, and being in a shape and a size such as to be inserted from the opening of the cylindrical housing and abutted against the stepped surface, and the method for closing the opening of the cylindrical housing with the flat plate-shaped closing member, including:
  inserting, as a first step, the closing member from the opening of the cylindrical housing to be closed until the first surface abuts against the stepped surface; and
  swaging or crimping, as a second step, with the use of the rolling-swaging tool or rolling-crimping tool, by rotating the support shaft while the annular first swaging portion, the first annular inclined surface and the annular second swaging portion are continuously abutted in this order against an outer surface of the distal end circumferential wall of the cylindrical housing, and while the second annular inclined surface is abutted against an outer circumferential edge of a distal end annular surface of the distal end circumferential wall.

Further, the present invention provides a method for closing an opening of a cylindrical housing of a gas generator with an igniter by using the rolling-swaging tool or rolling-crimping tool, the cylindrical housing having a stepped surface formed radially on an inner side of a circumferential wall on the side of one of openings, and a distal end circumferential wall from the stepped surface to the opening, the igniter having,
  an igniter main body which has an ignition portion and an electroconductive pin extending axially opposite to the ignition portion, and
  an ignition collar which surrounds a part of the igniter main body, the igniter collar having an annular plate portion which protrudes radially outward and has a maximum outer diameter and a circumferential wall excluding the annular plate portion, the annular plate portion being in a shape and a size such as to be inserted from the opening of the cylindrical housing and abutted against the stepped surface, the method for closing the opening of the cylindrical housing with the igniter, including:
inserting, as a first step, the igniter from the opening of the cylindrical housing to be closed until the annular plate portion of the igniter collar abuts against the stepped surface; and
swaging or crimping, as a second step, with the use of the rolling-swaging tool or rolling-crimping tool, by rotating the support shaft while the annular first swaging portion, the first annular inclined surface and the annular second swaging portion are continuously abutted in this order against an outer surface of the distal end circumferential wall of the cylindrical housing, and while the second annular inclined surface is abutted against an outer circumferential edge of a distal end annular surface of the distal end circumferential wall.

BRIEF DESCRIPTION OF DRAWINGS

The present invention will become more fully understood from the detailed description given hereinbelow and the accompanying drawings which are given by way of illustration only, and thus are no limitative of the present invention and wherein:

FIG. 3 shows, in (a), a plan view of the rolling-swaging tool shown in FIG. 1, and, in (b), a plan view of a rolling-swaging tool of an embodiment different from that shown in FIG. 1;

FIG. 8 shows, in (a), a partially enlarged sectional view of the configuration shown in FIG. 7, and, in (b), a partially enlarged sectional view for explaining a conventional art in the fourth step shown in FIG. 7;

FIG. 10 shows, in (a), an axial sectional view of a known gas generator, and, in (b), a partial cross-sectional view for explaining a production step shown in (a).

DETAILED DESCRIPTION OF INVENTION

In JP-A No. 2011-157025, before the igniter 16 (the igniter collar 17) is attached to the one end 10a of the cylindrical housing 10, there is a gap between the one end 10a and the igniter collar 17 as shown in (b) in FIG. 10. The igniter 16 will fall off if it is left as it is, and therefore, the one end 10a of the cylindrical housing 10 is reduced in diameter to obtain the state shown in (a) in FIG. 10.

JP-A No. 2011-157025 discloses no specific processing method, but it is known to employ a rolling-swaging method in a manufacturing process of a gas generator (JP-A No. 2007-223485, JP-A No. 2008-241186), and the rolling-swaging method can also be employed as a method for reducing the diameter of the one end 10a of the cylindrical housing 10.

When the one end 10a of the cylindrical housing 10 shown in (b) in FIG. 10 is swaged by rolling as shown in (a) in FIG. 10, under a certain swaging condition, part or the whole of the outer surface of the one end 10a may extend in the axis X direction and a protrusion may be formed.

Where such a protrusion is left as it is, there is a possibility that a mouth portion of an airbag may be damaged by the protrusion and the airbag becomes unusable when the airbag covers the gas generator from the diffuser portion 12 and reaches the one end 10a. With the conventional rolling-swaging tool, it is difficult to completely eliminate this possibility.

Although the problem can be solved by cutting off the protrusion, this adds a step of the removal operation.

The present invention provides a rolling-swaging tool or rolling-crimping tool for rolling-swaging or rolling-crimping an opening of a cylindrical member and a method of closing the opening of the cylindrical member by using the rolling-swaging tool or rolling-crimping tool.

When the opening of the cylindrical member is swaged by rolling with the rolling-swaging tool of the present invention, the circumferential wall close to the opening is gradually reduced in diameter (deforms so that the outer diameter decreases).

In this process, there is a case in which part or the whole of an outer surface of the end portion of the cylindrical member extends in the axial direction and such a protrusion is formed that protrudes in the axis X direction from an outer circumferential edge. However, when the outer circumferential edge of a distal end portion of the opening is abutted against a second inclined surface of the rolling-swaging tool and rolling-swaging is performed in this state, the protrusion is unlikely to be formed on the end portion on the side of the outer surface of the cylindrical member but is likely to be formed on the end portion on the side of the inner surface of the cylindrical member. Thereby, the protrusion is prevented from being formed on the end portion on the side of the outer surface of the cylindrical member.

It is preferable in the rolling-swaging tool according to the present invention that a ratio (t/r) of a radius (r) of an inscribed circle for the second annular inclined surface which is the curved surface and a thickness (t) of the opening of the cylindrical member which is an object of the rolling-swaging is 2 to 9.

The t/r ratio is preferably in this range because a protrusion is easily prevented from being formed on the end portion on the side of the outer surface of the cylindrical member.

It is preferable in the rolling-swaging tool according to the present invention that the number of the rotating shafts is 2 or 3, and the number of the substantially disk-shaped swaging portions is 2 or 3.

By using such a rolling-swaging tool, a working speed also increases and uniform swaging is realized.

Where the rolling-swaging is performed using the rolling-swaging tool of the present invention, even when the opening of the cylindrical housing is closed with a closing member (a disk), a protrusion protruding outward in the axis X direction is not formed on a distal end annular surface on the side of an outer circumferential wall surface (an outer circumferential edge) of a distal end circumferential wall, but is formed on the distal end annular surface only on the side of an inner circumferential wall surface of the distal end circumferential wall.

Thereby, even when the gas generator is covered with the airbag, the airbag is prevented from being caught and ruptured by the protrusion.

Figure 1:
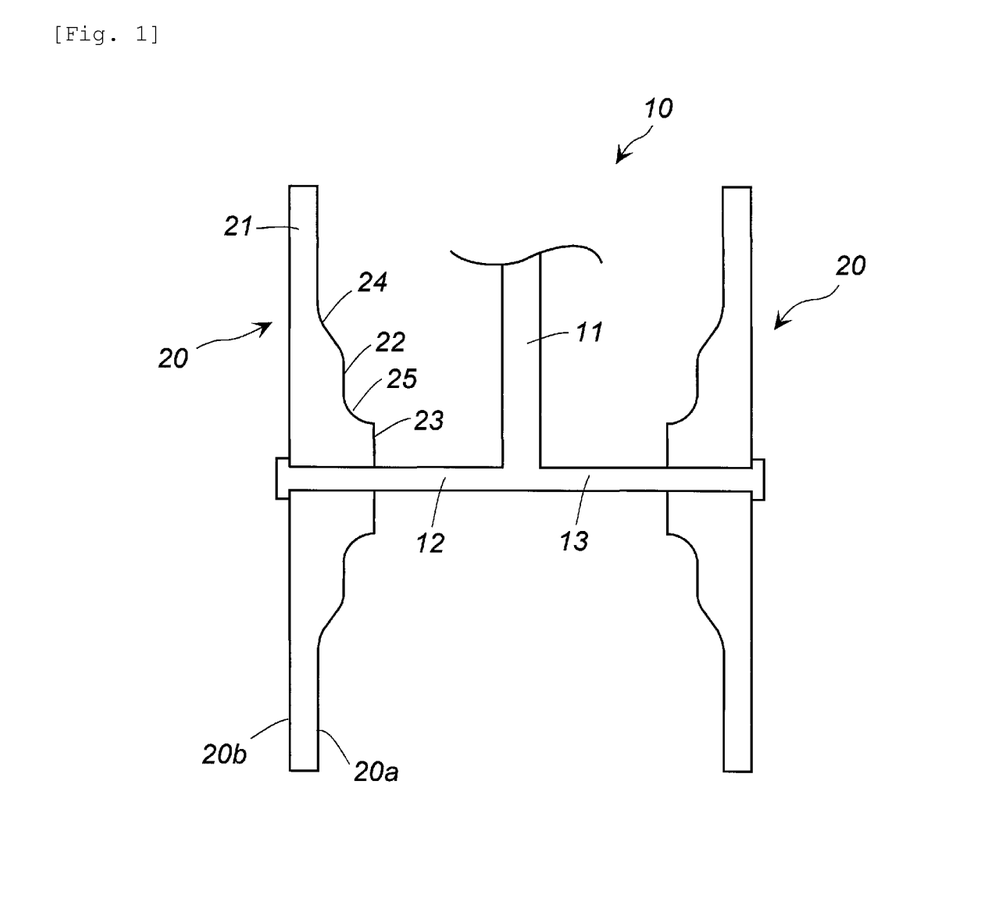
FIG. 1 shows a cross-sectional view of a rolling-swaging tool of the present invention in which a swaging portion is cut in a radial cross section.
Figure 2:
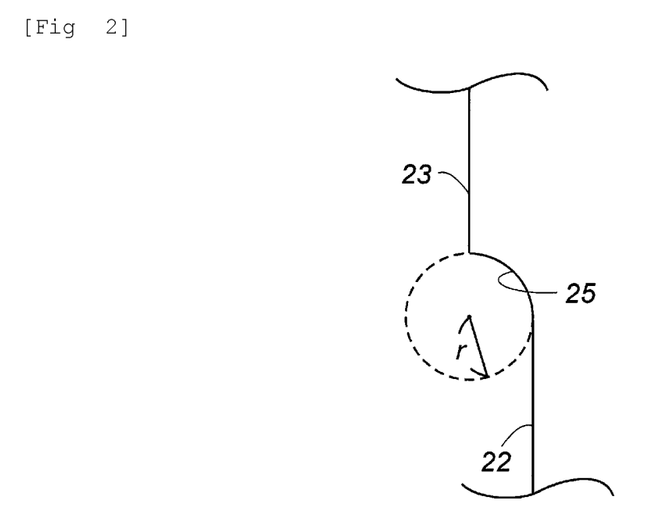
FIG. 2 shows a partial enlarged view of the rolling-swaging tool shown in FIG. 1.
Figure 3:
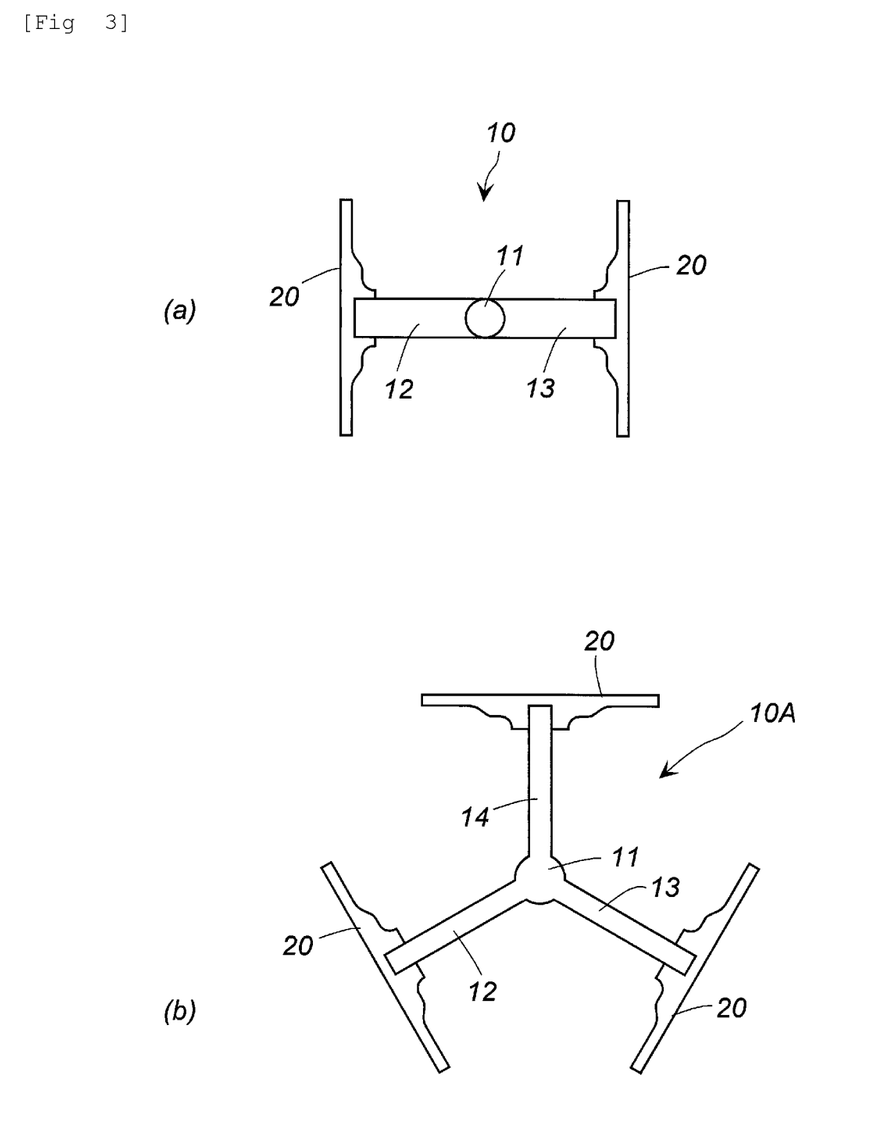

A method for closing the opening of the cylindrical housing with the closing member using the rolling-swaging tool of the present invention can be employed as a method for closing an opening of a cylindrical housing with the use of, for example, the second closing member 14 of the gas generator shown in FIGS. 1 and 2 of JP-A No. 2011-225069, the first closing member 14 of the gas generator shown in FIG. 1 of JP-A No. 2011-218942, and the second closure 16 of the gas generator 10 shown in FIG. 1, the gas generator 10a shown in FIG. 2 and the gas generator 10b shown in FIG. 3 of JP-A No. 2007-30656.

A stepped surface of the cylindrical housing can be any of an annular stepped surface formed continuously in the circumferential direction on the inner circumferential surface of the cylindrical housing, an annular convex portion obtained by the inner circumferential surface of the cylindrical housing protruding continuously in the circumferential direction, and a discontinuous convex portion which is a plurality of protrusions arranged discontinuously in the circumferential direction.

Where the rolling-swaging is performed using the rolling-swaging tool of the present invention, even when the opening of the cylindrical housing is closed with an igniter, a protrusion protruding in the axis X direction is not formed on the distal end annular surface on the side of the outer circumferential wall surface (the outer circumferential edge) of the distal end circumferential wall, but is formed on the distal end annular surface only on the side of the inner circumferential wall surface of the distal end circumferential wall.

Thereby, even when the gas generator is covered with the airbag, the airbag is prevented from being caught and ruptured by the protrusion.

A method for closing the opening of the cylindrical housing with the closing member using the rolling-swaging tool of the present invention can be employed for:

(I) a gas generator in which one end of a cylindrical housing is closed with a diffuser portion and a rupturable plate fixed to the one end, the diffuser portion being provided with a gas discharge port (closed with a seal tape), and the other end portion is closed with an igniter, as shown in, for example, FIG. 1 of JP-A No. 2015-89760, FIG. 1 of JP-A No. 2014-156207 and FIG. 1 of JP-A No. 2006-306218; and (II) a gas generator in which one end is closed, the other end portion is closed with an igniter, and a gas discharge port is provided in a circumferential wall of a housing as shown in, for example, FIG. 1 of JP-A No. 2015-9666, FIG. 1 of JP-A No. 2014-144736, and FIG. 1 of JP-A No. 2014-94614.

A stepped surface of the cylindrical housing can be any of an annular stepped surface formed continuously in the circumferential direction on the inner circumferential surface of the cylindrical housing, an annular convex portion obtained by the inner circumferential surface of the cylindrical housing protruding continuously in the circumferential direction, and a discontinuous convex portion which is a plurality of protrusions arranged discontinuously in the circumferential direction.

The rolling-swaging tool of the present invention is suitable for closing an opening of a cylindrical member together with other member.

When an opening of a cylindrical housing used in a gas generator for an airbag apparatus is closed with a flat plate-shaped closing member or an igniter by using the rolling-swaging tool of the present invention, the opening is closed with high sealability.

The rolling-swaging tool of the present invention is used for closing an opening of a cylindrical member in combination with other member.

The rolling-swaging tool of the present invention is suitably used when closing an opening of a cylindrical housing used in a gas generator for an airbag apparatus with a flat plate-shaped closing member or an igniter. Therefore, the rolling-swaging tool is also used for a method for assembling a gas generator.

Embodiments of the Invention

<Rolling-Swaging Tool>

A rolling-swaging tool 10 shown in FIG. 1 is used for swaging an opening of a cylindrical member in accordance with a rolling-swaging method.

The rolling-swaging tool 10 includes a support shaft 11 connected to a driving body (a motor or the like) which is not shown in the drawing, two rotating shafts 12, 13 extending in a direction orthogonal to the support shaft 11, and a substantially disk-shaped swaging portion 20 which is attached to each of the rotating shafts 12, 13.

The support shaft 11 has a function of transmitting a rotational motion from the driving body to the rotating shafts 12, 13. For example, a combination of a plurality of gears of different types may be provided as a rotating mechanism for rotating the rotating shaft 12 and the rotating shaft 13 in different directions.

The two substantially disk-shaped swaging portions 20 are of the same shape. The swaging portion 20 can be made detachable from the rotating shaft and replaced as necessary.

The support shaft 11, the rotating shafts 12, 13, and the swaging portion 20 are preferably made of stainless steel, iron, or the like.

The substantially disk-shaped swaging portion 20 has a first surface 20a which performs swaging, and a second surface 20b which is a plane surface on the opposite side to the first surface 20a in the thickness direction.

The first surface 20a has an annular first swaging portion 21 which has a minimum thickness and a maximum outer diameter, a disk third swaging portion 23 which has a maximum thickness and a minimum outer diameter, and an annular second swaging portion 22 which has a thickness between the minimum thickness and the maximum thickness and an outer diameter between the maximum outer diameter and the minimum outer diameter.

An outer diameter of each of the annular first swaging portion 21, the annular second swaging portion 22 and the disk third swaging portion 23 is adjusted according to a length of the closed portion of the cylindrical member to be closed.

A thickness of each of the annular first swaging portion 21, the annular second swaging portion 22, and the disk third swaging portion 23 is such that where a thickness of the disk third swaging portion 23 from the second surface 20b is taken as 1, a thickness of the annular second swaging portion 22 from the second surface 20b is about ⅔, and a thickness of the annular first swaging portion 21 from the second surface 20b is about ⅓.

Although the thickness of the annular first swaging portion 21 is not particularly limited, it can be substantially equal to a thickness of the cylindrical member to be closed.

Centers of the annular first swaging portion 21, the annular second swaging portion 22, and the disk third swaging portion 23 coincide.

A first annular inclined surface 24 is provided at a boundary between the annular first swaging portion 21 and the annular second swaging portion 22. The first annular inclined surface 24 may be a flat surface or a gently curved surface.

An angle (an acute angle portion) between the first annular inclined surface 24 and the annular first swaging portion 21 is less than 90 degrees and can be adjusted according to the deformation degree of the circumferential wall of the cylindrical member to be closed.

A second annular inclined surface 25 which is a curved surface is provided at a boundary between the annular second swaging portion 22 and the disk third swaging portion 23.

As shown in FIG. 2, in the curved surface of the second annular inclined surface 25, a ratio (t/r) of a radius (r) of an inscribed circle for the second annular inclined surface 25 and a thickness (t) of the opening of the cylindrical member which is an object of rolling-swaging (FIG. 4) is preferably in a range of 2 to 9, and more preferably in a range of 3 to 5.5.

In the rolling-swaging tool 10 shown in FIG. 1, a substantially disk-shaped swaging portion 20 is fixed to each of the rotating shaft 12 and the rotating shaft 13 arranged on the same line, as shown in (a) in FIG. 3.

The two swaging portions 20 may rotate clockwise or counterclockwise with respect to the rotating shafts 12, 13.

The swaging portion 20 is the same as the swaging portion 20 shown in FIGS. 1 and 2.

The rolling-swaging tool 10A shown in (b) in FIG. 3 has a support shaft 11 connected to a driving body (a motor or the like) which is not shown in the drawing, three rotating shafts 12, 13, 14 that are extended in directions orthogonal to the support shaft 11 and are equally spaced in the circumferential direction, and the substantially disk-shaped swaging portion 20 rotatably attached to each of the three rotating shafts.

The three substantially disk-shaped swaging portions 20 are of the same shape and are the same as those shown in FIGS. 1 and 2.

The number of the swaging portions 20 in the rolling-swaging tool of the present invention is adjusted according to a size and a shape of the cylindrical member to be swaged, but when the cross sectional shape in the width direction of the cylindrical member is circular, two or three swaging portions are preferable.

<Closing Method Using Rolling-Swaging Tool—1>

A method for closing an opening of a cylindrical housing with the use of the rolling-swaging tool 10 shown in FIG. 1 and (a) in FIG. 3 and a closing member will be described with reference to FIGS. 4 to 8.

Figure 4:
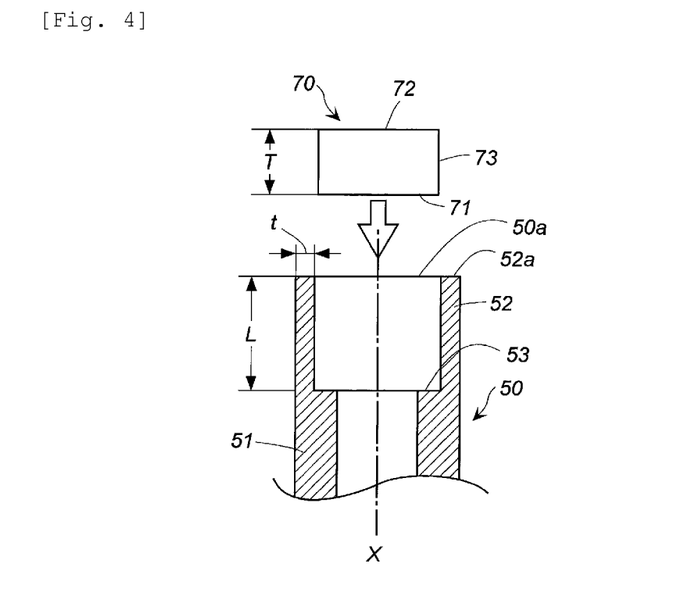
FIG. 4 shows an explanatory view of a first step of a method for closing an opening of a cylindrical housing by using a rolling-swaging tool and a flat plate-shaped closing member.

A cylindrical housing 50 has a circular cross section in the width direction and includes an annular stepped surface 53 formed radially on an inner side of a circumferential wall 51 on the side of an opening 50a and a distal end circumferential wall 52 from the annular stepped surface 53 to the opening 50a.

The annular stepped surface 53 is obtained by a difference in thickness between the circumferential wall 51 and the distal end circumferential wall 52, and a thickness of the distal end circumferential wall 52 is less than a thickness of the circumferential wall 51 where the distal end circumferential wall 52 is not provided.

The annular stepped surface 53 may be an annular convex portion formed on the inner surface of the circumferential wall 51 on the side of the opening 50a of the cylindrical housing 50, rather than in the form shown in FIG. 4. In this case, a portion from the annular convex portion to the opening 50a corresponds to the distal end circumferential wall 52, and a thickness of the distal end circumferential wall 52 is the same as the thickness of the circumferential wall 51 where the distal end circumferential wall 52 is not provided.

The ratio (t/r) between the thickness (the thickness of the distal end circumferential wall 52) (t) of the opening 50a of the cylindrical housing and the radius (r) of the inscribed circle for the curved surface of the second annular inclined surface 25 of the swaging portion 20 is 2 to 9.

The cylindrical housing 50 is used in a gas generator and can be used, for example, in the gas generator shown in FIGS. 1 and 2 of JP-A No. 2011-225069, the gas generator shown in FIG. 1 of JP-A No. 2011-218942, and the gas generator 10 shown in FIG. 1, the gas generator 10a shown in FIG. 2, and the gas generator 10b shown in FIG. 3 of JP-A No. 2007-30656.

A closing member 70 is a disk which includes a first surface 71, a second surface 72 on the opposite side to the first surface 71 in the thickness direction, and a circumferential surface 73 between the first surface 71 and the second surface 72.

The closing member 70 is in a shape and a size that enable the closing member to be inserted from the opening 50a of the cylindrical housing 50 and abutted against the annular stepped surface 53.

Preferably, a thickness (T) of the closing member 70 is smaller than a length (L) of the distal end circumferential wall and T/L is 0.4 to 0.6.

(First Step)

As shown in FIG. 4, the closing member 70 is inserted from the opening 50a of the cylindrical housing 50 to be closed until the first surface 71 abuts against the annular stepped surface 53.

At this time, the circumferential surface 73 of the closing member 70 is abutted lightly against the distal end circumferential wall 52 or is radially opposed thereto with a slight gap therebetween.

(Second Step)

Figure 5:
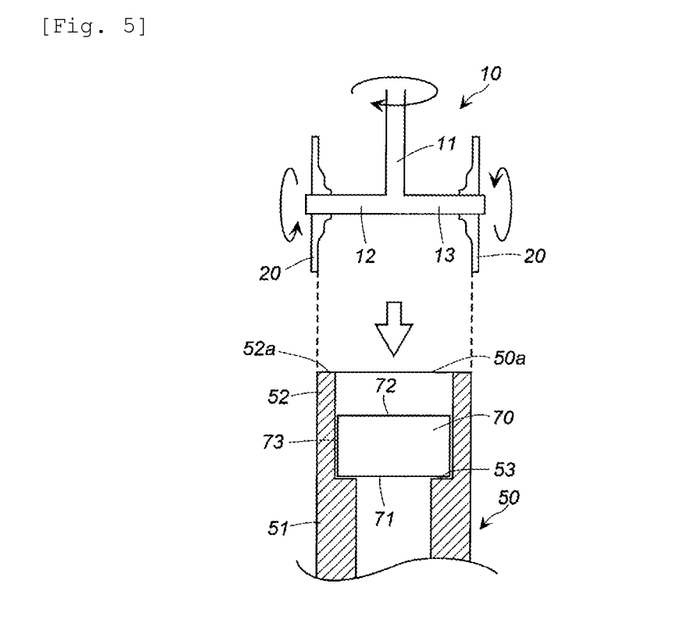
FIG. 5 shows an explanatory view of a second step of a method for closing an opening of a cylindrical housing by using the rolling-swaging tool and the flat plate-shaped closing member.
Figure 6:
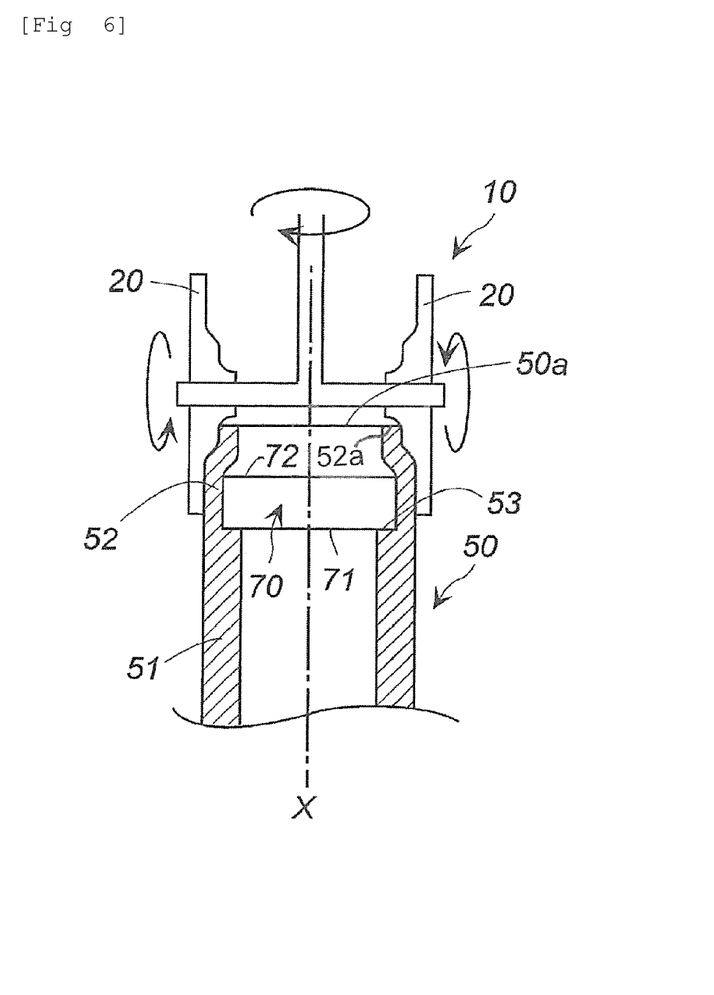
FIG. 6 shows an explanatory view of a third step of a method for closing an opening of a cylindrical housing by using the rolling-swaging tool and the flat plate-shaped closing member.

As shown in FIGS. 5 and 6, with the use of the rolling-swaging tool 10, swaging is performed by rotating the support shaft 11 while the annular first swaging portion 21, the first annular inclined surface 24 and the annular second swaging portion 22 are continuously abutted in this order against an outer surface of the distal end circumferential wall 52 of the cylindrical housing 50 (the swaging portion 20 is pressed against the opening 50a).

By this swaging in the second step, an outer shape of the distal end circumferential wall 52 is processed into a shape corresponding to an outer shapes of the annular first swaging portion 21, the first annular inclined surface 24 and the annular second swaging portion 22.

Figure 7:
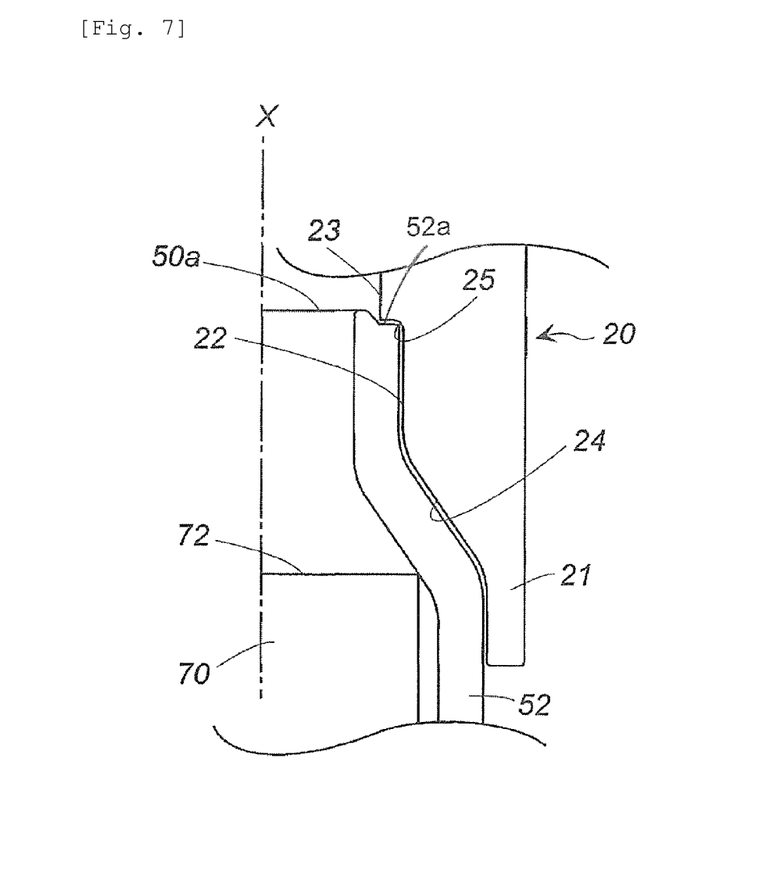
FIG. 7 shows an explanatory view of a fourth step of a method for closing an opening of a cylindrical housing by using the rolling-swaging tool and the flat plate-shaped closing member.

Further, as shown in FIGS. 6 and 7, in the swaging of the second step, the swaging is performed in a state in which the rotating second annular inclined surface 25 is abutted against an outer circumferential edge of the distal end annular surface 52a of the distal end circumferential wall 52.

Figure 8:
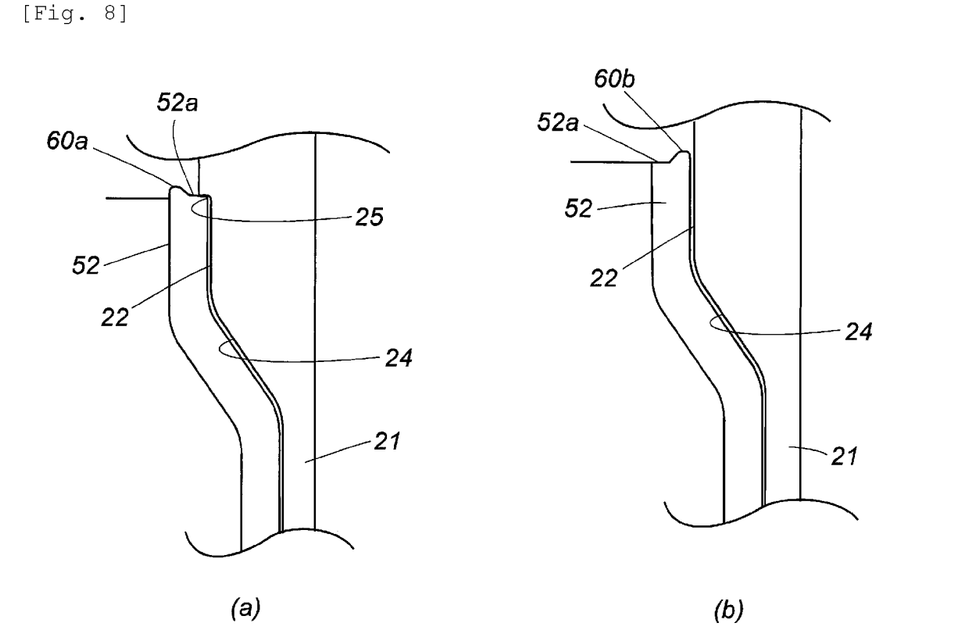

As shown in (b) in FIG. 8, when the rolling-swaging is performed with a rolling-swaging tool which has no second annular inclined surface 25, a metal forming the cylindrical housing 50 (a metal in the outer circumferential edge portion) moves in the axis X direction by receiving a pressure generated by the swaging. As a result, a protrusion 60b is likely formed on the distal end annular surface 52a on the side of the outer surface of the distal end circumferential wall 52.

However, as shown in (a) in FIG. 8, when the swaging is performed with the second annular inclined surface 25 abutted against the distal end annular surface 52a, the distal end annular surface 52a on the side of the outer circumferential wall surface of the distal end circumferential wall 52 is inhibited from extending axially but the distal end annular surface 52a on the side of the inner circumferential wall surface of the distal end circumferential wall 52 extends to form a projection 60a.

When the rolling-swaging tool 10 of the present invention (or the rolling-swaging tool 10A shown in (b) in FIG. 3) is used, by the action of the second annular inclined surface 25, it is suppressed that the protrusion 60b is formed on the distal end annular surface 52a on the side of the outer circumferential wall surface (the outer circumferential edge) of the distal end circumferential wall 52, and the protrusion 60*a* is formed on the distal end annular surface 52*a* on the side of the inner circumferential wall surface of the distal end circumferential wall 52.

At this time, it is preferred that the ratio (t/r) of the thickness (the thickness of the distal end circumferential wall 52) (t) of the opening 50*a* of the cylindrical housing and the radius (r) of the inscribed circle for the curved surface of the second annular inclined surface 25 of the swaging portion 20 is in a range of 2 to 9 because the protrusion 60*b* is unlikely to be formed and the protrusion 60*a* is easily formed.

<Closing Method Using Rolling-Swaging Tool—2>

A method for closing an opening of a cylindrical housing with the use of the rolling-swaging tool 10 shown in FIG. 1 and (a) in FIG. 3 and an igniter will be described with reference to FIG. 9.

A cylindrical housing 112 has a circular cross section in the width direction and includes an annular stepped surface 117 formed radially on an inner side of a circumferential wall 113 on the side of an opening 112*a* and a distal end circumferential wall 113*a* from the annular stepped surface 117 to the opening 112*a*.

The annular stepped surface 117 is obtained by a difference in thickness between the circumferential wall 113 and the distal end circumferential wall 113*a*, and a thickness of the distal end circumferential wall 113*a* is less than a thickness of the circumferential wall 113 where the distal end circumferential wall 113*a* is not provided.

The annular stepped surface 117 may be an annular convex portion formed on the inner surface of the circumferential wall 113 on the side of the opening 112*a* of the cylindrical housing 112. In this case, a portion from the annular convex portion to the opening 112*a* corresponds to the distal end circumferential wall 113*a*, and a thickness of the distal end circumferential wall 113 a is the same as the thickness of the circumferential wall 113 where the distal end circumferential wall 113*a* is not provided.

The ratio (t/r) between the thickness (the thickness of the distal end circumferential wall 113*a*) (t) of the opening 112*a* of the cylindrical housing and the radius (r) of the inscribed circle for the curved surface of the second annular inclined surface 25 of the swaging portion 20 is 2 to 9.

The cylindrical housing 112 is used in a gas generator, and the same housing as used in the known gas generators of (I) and (II) hereinabove can be used.

Figure 9:
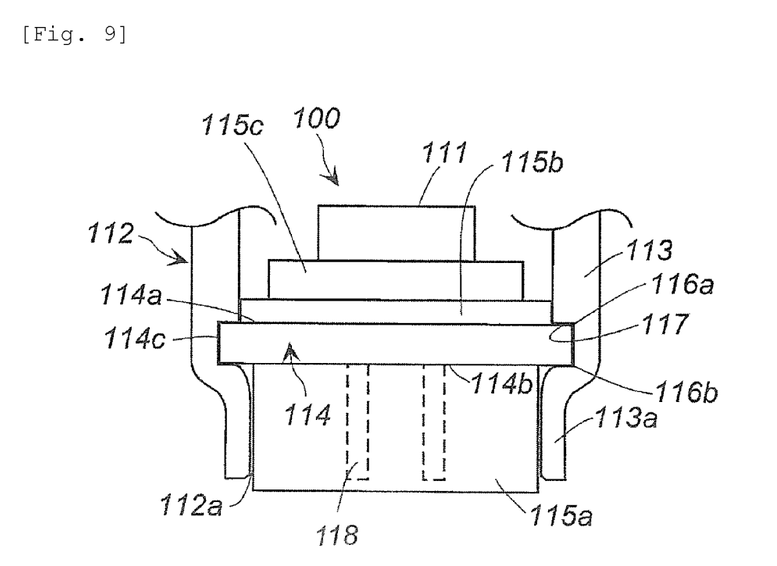
FIG. 9 shows an axial cross-sectional view taken when an opening of a cylindrical housing is closed using a rolling-swaging tool and an igniter.

As shown in FIG. 9, an igniter 100 includes an igniter main body which has an ignition portion 111 and an electroconductive pin 118 extending axially opposite to the ignition portion 111, and an ignition collar which surrounds apart of the igniter main body. The axis of the igniter 100 and the axis of the cylindrical housing 112 are coincident.

The igniter collar has an annular plate portion 114 which protrudes radially outward and has a maximum outer diameter, and circumferential walls 115*a* to 115*c* which do not include the annular plate portion 114.

The circumferential walls are, with the annular plate portion 114 in-between, a first circumferential wall 115*a* on the side of the electroconductive pin 118, and a second circumferential wall 115*b* and a third circumferential wall 115*c* on the side of the ignition portion 111. The first circumferential wall 115*a*, the second circumferential wall 115*b* and the third circumferential wall 115*c* have different outer diameters, but they may have the same outer diameter.

A space (a connector insertion space) to enclose the electroconductive pin 118 is formed inside the first circumferential wall 115*a*, and a concave portion matched to fit a hook portion of the connector is formed on the inner wall surface forming the connector insertion space.

The annular plate portion 114 is preferably made of a metal (such as iron or stainless steel), and the circumferential walls 115*a* to 115*c* are preferably made of a synthetic resin.

The annular plate portion 114 has a first annular surface 114*a* facing the ignition portion 111, a second annular surface 114*b* facing the electroconductive pin 118, and an annular circumferential surface 114*c* between the first annular surface 114*a* and the second annular surface 114*b*.

Further, the annular plate portion 114 has a corner portion which is a first annular circumferential edge 116*a* at a boundary between the first annular surface 114*a* and the annular circumferential surface 114*c* and a corner portion which is a second annular circumferential edge 116*b* at a boundary between the second annular surface 114*b* and the annular circumferential surface 114*c*.

When closing the opening 112*a* of the cylindrical housing 112 with the igniter 100, it is possible to carry out the first step and the second step same as when the closing member 70 is used.

First, in the same manner as shown in FIG. 4 (the first step), the igniter 100 is inserted from the opening 112*a* of the cylindrical housing 112 to be closed until the first annular surface 114*a* of the annular plate portion 114 abuts against the annular stepped surface 117.

At this time, the annular circumferential surface 114*c* of the annular plate portion 114 is abutted lightly against the distal end circumferential wall 113*a* or is radially opposed thereto with a slight gap therebetween.

Thereafter, the opening 112*a* of the cylindrical housing 112 is closed with the igniter 100 as shown in FIG. 9 by performing the second step shown in FIG. 5 to (a) in FIG. 8.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A rolling-swaging tool used for swaging an opening of a cylindrical member in accordance with a rolling-swaging method, the rolling-swaging tool, comprising:
a support shaft connected to a driving body;
a shaft connected to the support shaft; and
substantially disk-shaped swaging portions, each of which being rotatably supported by the shaft,
each of the substantially disk-shaped swaging portions having a first surface which performs swaging and a second surface on the opposite side in a disk thickness direction,
the first surface having,
an annular first swaging portion which has a minimum thickness and a maximum outer diameter,
a disk third swaging portion which has a maximum thickness and a minimum outer diameter, and
an annular second swaging portion which has a thickness between the minimum thickness and the maximum thickness and an outer diameter between the maximum outer diameter and the minimum outer diameter, a first annular inclined surface being provided at a boundary between the annular first swaging portion and the annular second swaging portion, a second annular inclined surface which is a curved surface, being provided at a boundary between the annular second swaging portion and the disk third swaging portion.

2. The rolling-swaging tool according to claim 1, wherein the shaft includes two or more shafts, and a substantially disk-shaped swaging portion is supported by each of the two or more shafts.

3. The rolling-swaging tool according to claim 2, wherein the plurality of shafts extends in different directions from one another.

4. A method for closing an opening of a cylindrical housing of a gas generator with a flat plate-shaped closing member by using the rolling-swaging tool according to claim 1, the cylindrical housing having a stepped surface formed radially on an inner side of a circumferential wall on a side of the opening, and a distal end circumferential wall from the stepped surface to the opening, the flat plate-shaped closing member being a disk which includes a first surface, a second surface on an opposite side to the first surface in a plate thickness direction, and a circumferential surface between the first surface and the second surface, and being in a shape and a size such as to be inserted from the opening of the cylindrical housing and abutted against the stepped surface, and the method for closing the opening of the cylindrical housing with the flat plate-shaped closing member, comprising:

inserting, as a first step, the closing member from the opening of the cylindrical housing to be closed until the first surface abuts against the stepped surface; and swaging, as a second step, with the use of the rolling-swaging tool, by rotating the support shaft while the annular first swaging portion, the first annular inclined surface and the annular second swaging portion are continuously abutted in this order against an outer surface of the distal end circumferential wall of the cylindrical housing, and while the second annular inclined surface is abutted against an outer circumferential edge of a distal end annular surface of the distal end circumferential wall.

5. A method for closing an opening of a cylindrical housing of a gas generator with an igniter by using the rolling-swaging tool according to claim 1, the cylindrical housing having a stepped surface formed radially on an inner side of a circumferential wall on a side of the opening, and a distal end circumferential wall from the stepped surface to the opening, the igniter having,
an igniter main body which has an ignition portion and an electroconductive pin extending axially opposite to the ignition portion, and
an igniter collar which surrounds a part of the igniter main body, the igniter collar having an annular plate portion which protrudes radially outward and has a maximum outer diameter and a circumferential wall excluding the annular plate portion, the annular plate portion being in a shape and a size such as to be inserted from the opening of the cylindrical housing and abutted against the stepped surface, and the method for closing the opening of the cylindrical housing with the igniter, comprising:

inserting, as a first step, the igniter from the opening of the cylindrical housing to be closed until the annular plate portion of the igniter collar abuts against the stepped surface; and swaging, as a second step, with the use of the rolling-swaging tool, by rotating the support shaft while the annular first swaging portion, the first annular inclined surface and the annular second swaging portion are continuously abutted in this order against an outer surface of the distal end circumferential wall of the cylindrical housing, and while the second annular inclined surface is abutted against an outer circumferential edge of a distal end annular surface of the distal end circumferential wall.

6. The rolling-swaging tool according to claim 1, wherein the rotating shaft extends in a direction orthogonal to the support shaft.

7. The rolling-swaging tool according to claim 1, wherein the substantially disk-shaped swaging portions include two or three substantially disk-shaped swaging portions, and a shape of each of the substantially disk-shaped swaging portions is the same.

* * * * *